March 22, 1938.  R. P. SCHWARTZ  2,111,815
MACHINE FOR COPYING CONTOURS
Filed Aug. 21, 1936   3 Sheets-Sheet 1
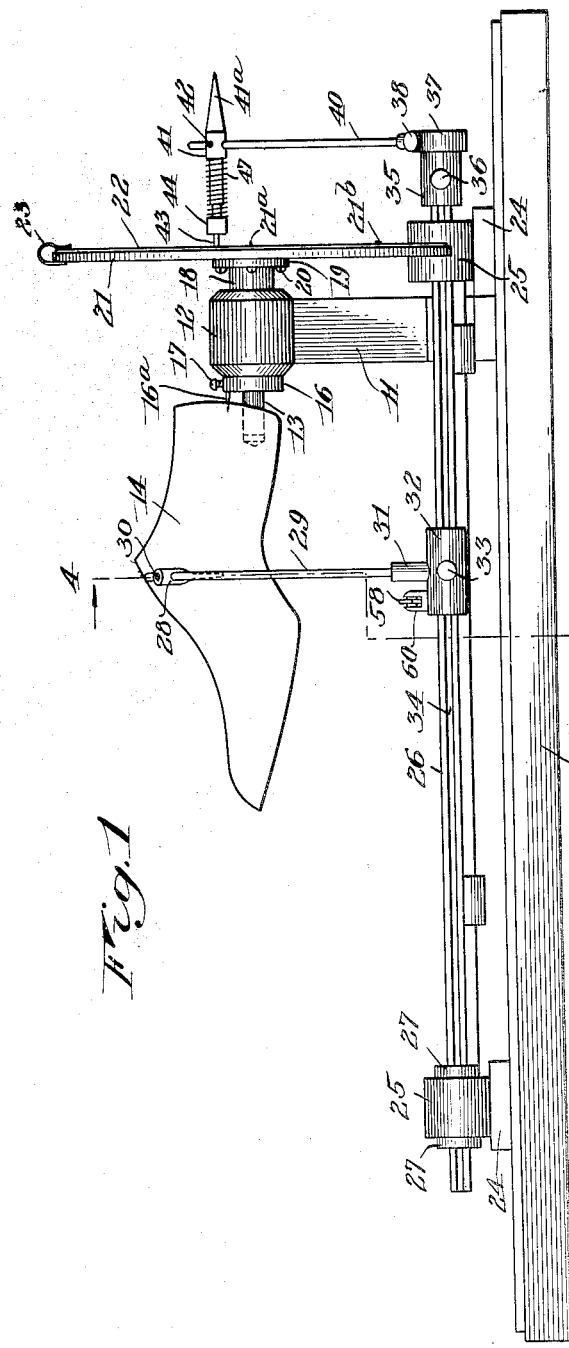
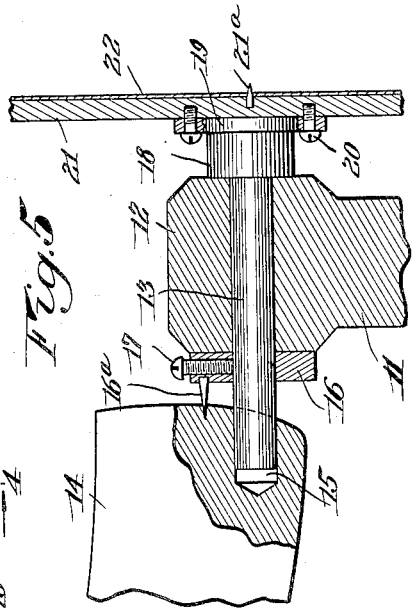
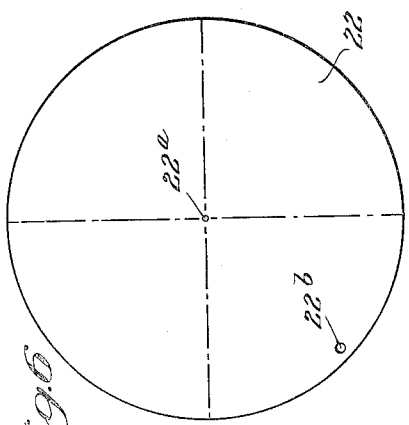
INVENTOR.
Russell Plato Schwartz
BY Cumpston & Shepard
his ATTORNEYS March 22, 1938.    R. P. SCHWARTZ    2,111,815
MACHINE FOR COPYING CONTOURS
Filed Aug. 21, 1936    3 Sheets-Sheet 2
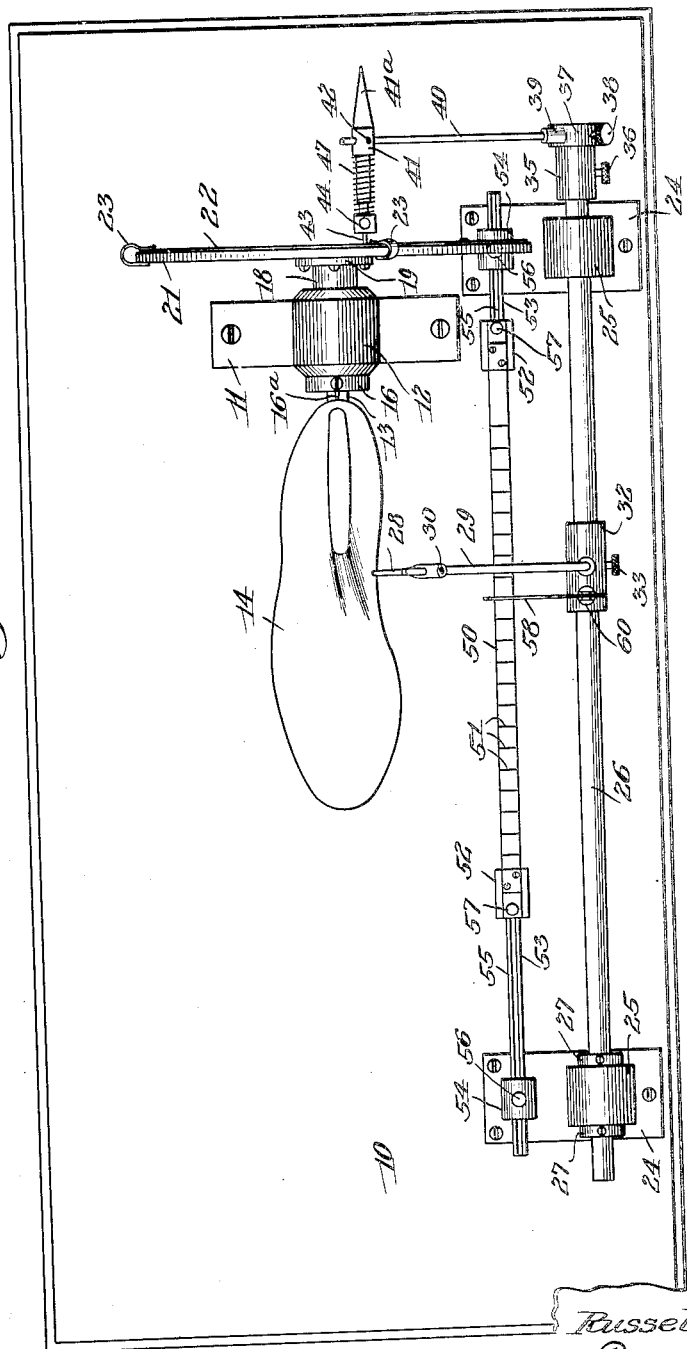
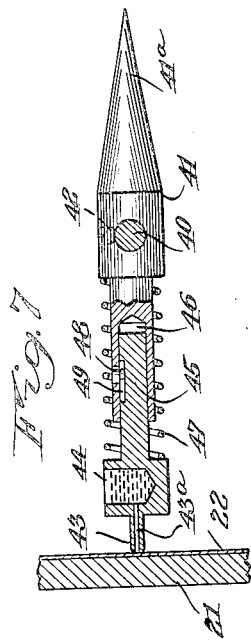
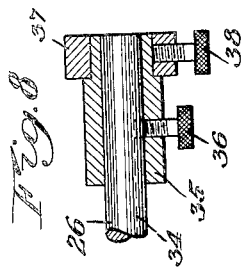
INVENTOR.
Russell Plato Schwartz
BY Cumpston & Shepard
his ATTORNEYS March 22, 1938.  R. P. SCHWARTZ  2,111,815
MACHINE FOR COPYING CONTOURS
Filed Aug. 21, 1936  3 Sheets-Sheet 3
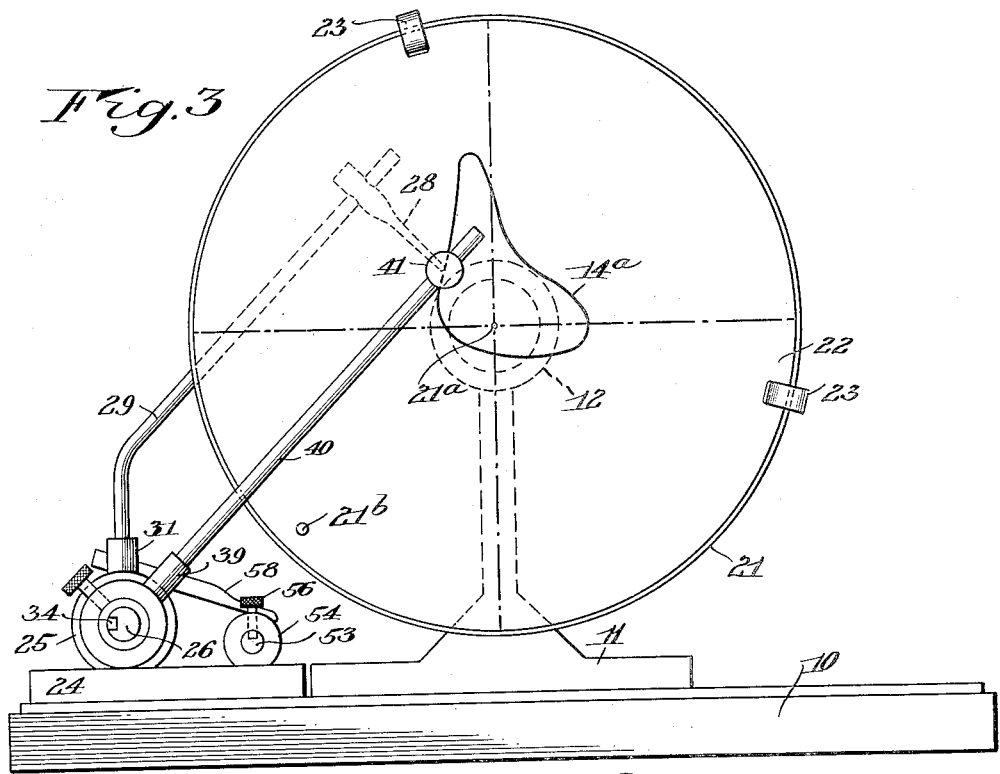
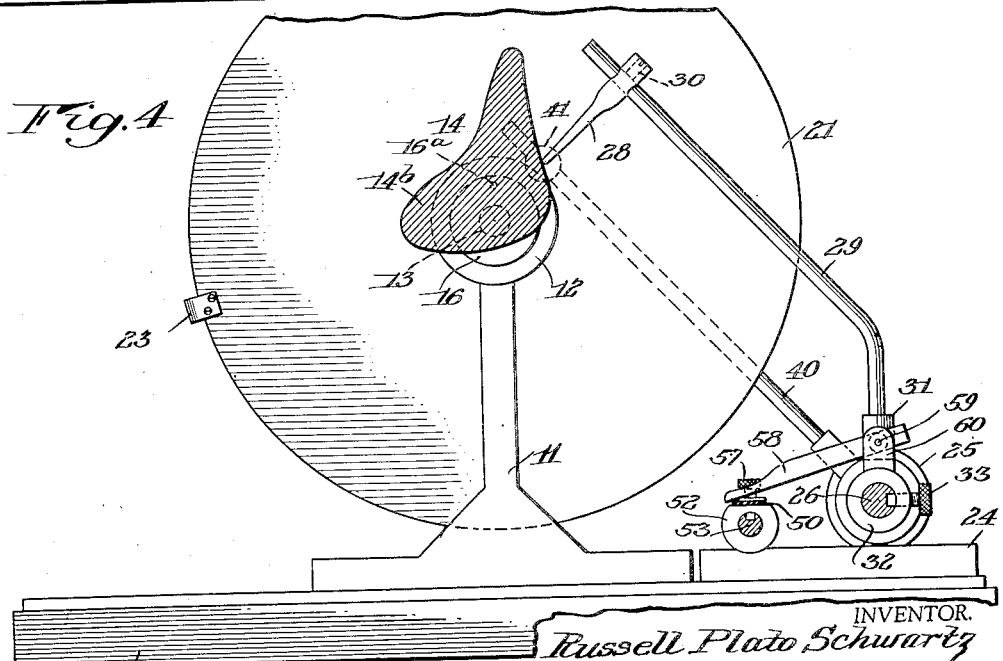
INVENTOR.
Russell Plato Schwartz
BY Cumpston & Shepard
his ATTORNEYS Patented Mar. 22, 1938

2,111,815

UNITED STATES PATENT OFFICE 2,111,815

MACHINE FOR COPYING CONTOURS

Russell Plato Schwartz, Rochester, N. Y.

Application August 21, 1936, Serial No. 97,230

19 Claims. (Cl. 33—24)

Heretofore it has been impossible to readily and accurately obtain the measurements of a shoe last at any given point thereof, or to reproduce the contours of the same corresponding to different cross sectional outlines of the last, it being usually customary in such cases to saw the last in two. Obviously such a method is inaccurate, expensive, impracticable, and generally unsatisfactory.

However, with the present method exceedingly accurate reproductions of the contours of different lasts corresponding to various cross sectional areas of each can be readily recorded on separate charts. This can be accomplished without alteration of the significant contours of the last analyzed. Such charts can be tabulated so that records may be kept on file corresponding to the cross sectional areas of lasts of various sizes, contours, and proportions for use when needed as an aid to the proper selection of a last corresponding to a shoe best suited to the requirements of an individual, or group of individuals. In other words, with a series of tabulated charts containing different contours of each of a number of different lasts a great deal of time can be saved and trouble avoided in the selection of the proper shoes for normal feet and for different individuals requiring foot treatment to correct faulty conditions resulting from improper walking and other causes.

A primary object of the invention is, therefore, to provide an improved machine of the class described for efficiently and economically copying the contours of lasts and other three dimensional objects to obtain standardization measurements or data which will be useful for different purposes.

A further object of the invention is to provide an improved machine of this class having a marking or recording instrument operated by a tracing instrument adapted to be progressively advanced longitudinally of the last in one direction and to successively contact the last at various points with the result that the recording instrument will serve to reproduce on different charts contours of the last corresponding to cross sectional outlines thereof at said points.

A further object of the invention is to provide a compact and simplified copying machine having means for rotatably supporting a last and a sheet or chart, together with tracing and recording instruments for cooperation respectively with the last and the chart and connected in such a manner that the recording instrument will respond to the movements of the tracing instrument and be maintained in such relation thereto as to accurately record full sized reproductions of the contours of the lasts contacted by the tracing instrument.

To these and other ends the invention resides in certain improvements and combinations of parts, all as will be hereinafter more fully described, the novel features being pointed out in the claims at the end of the specification.

In the drawings:

Fig. 1 is a side elevation of a machine embodying one form of the invention;

Fig. 2 is a top plan view of the same;

Fig. 3 is an end elevation of the machine as viewed from the right of Fig. 1;

Fig. 4 is a transverse sectional elevation taken substantially on line 4—4 of Fig. 1;

Fig. 5 is a fragmentary sectional elevation through the last supporting and rotating means;

Fig. 6 is a face view of a chart on which the contours of the last are to be recorded;

Fig. 7 is a sectional elevation of a marking or recording instrument drawn to an enlarged scale and showing the point of the instrument in contact with the chart, and Fig. 8 is a longitudinal section through the mounting for the arm for supporting the recording instrument.

The same reference numerals throughout the several views indicate the same parts.

Referring to the drawings, 10 designates a base for supporting the machine on which is suitably secured an upstanding bracket 11 having a bearing portion 12 in which is rotatably mounted a spindle 13 as best shown in Fig. 5. The spindle forms a support for the last 14, the heel portion of which has a bore 15 for receiving the inner end of the spindle which fits tightly within the bore. A collar 16 is secured on the spindle at the inner side of the bearing by means of a set screw 17. The last is prevented from turning on the spindle by means of a tapered pin 16a suitably secured upon the collar and forced into the rear portion of the heel of the last as shown in Fig. 5.

The outer end of the spindle has fixed thereon a head 18 which prevents longitudinal movement of the spindle in one direction while the collar 16 serves to hold the spindle against longitudinal movement in an opposite direction. The head is provided with a flange 19 connected by means of screws 20 with a disk 21 forming a holder for the chart or sheet 22 formed of paper or other suitable material. The chart is adapted to have marked or reproduced thereon a contour of the last corresponding to a transverse section of the last, one of such contours being indicated at 14a in Fig. 3 which corresponds to the section of the last shown at 14b in Fig. 4. The manner of forming or reproducing such contours on the charts will be described hereinafter.

The chart 22 is held in position upon the disk by means of a suitable number of spring clips 23 attached to the disk and having their free ends resting upon the chart adjacent the peripheral portion of the disk, as shown in Fig. 3.

The chart is preferably provided with apertures 22a and 22b, the former for receiving a tapered pin 21a projecting from the disk, and the latter for receiving a corresponding pin 21b carried by the disk, said pins serving to prevent rotation of the chart upon the disk.

Mounted on the base 10 is a pair of brackets 24 having bearings 25, within which the opposite ends of a rod or shaft 26 are journaled, the shaft being held against longitudinal movement by the collars 27 secured on the end of the shaft journaled in the left hand bearing 25 as shown in Fig. 2.

The rod 26 is free to turn in the bearings 25 and forms an oscillatory support for the arms provided for supporting the tracing instrument for contacting and following the contours of the last and the recording instrument for reproducing the contours upon the charts 22 carried by the rotating disk 21. The part of the instrument adapted to contact with the last comprises what is generally termed a tracing point designated by the reference numeral 28 and which has its outer end sleeved on a supporting arm 29 for adjustment longitudinally thereof and is held in adjusted position by a set screw 30, Figs. 2 and 4. The arm is secured within a lateral extension 31 on the sleeve 32 which is slidably mounted on the rod 26 and held in adjusted position by means of a set screw 33. The rod is provided with a longitudinally extending slot 34 for receiving the inner end of the set screw to prevent turning of the sleeve on the rod.

The means for supporting the arm carrying the recording or chart marking instrument comprises a sleeve 35 longitudinally adjustable on the rod 26 and adapted to be held in adjusted position by a set screw 36, which is adapted to take into the slot 34 of the rod, Figs. 2 and 8. Rotatably adjustable on the sleeve 35 is a collar 37 adapted to be held in adjusted position by a set screw 38. The collar has a lateral projection 39 within which is secured the arm 40 for supporting the recording instrument shown in section in Fig. 7 and comprising a holder 41 sleeved on the arm 40 for longitudinal adjustment thereon and held in adjusted position by means of a set screw 42.

The recording instrument preferably comprises a pen 43 for engaging the chart 22 as shown in Fig. 7, the pen having an ink-well 44 formed on a supporting shank 45 slidably mounted in a recess 46 of the holder 41. The pen is yieldingly held in contact with the chart 22 by means of a spring 47, one end of which is seated on the ink-well and the other on the enlarged outer portion of the holder, as shown in Fig. 7. Outward movement of the pen on the holder is limited by a pin 48 carried by the holder and projecting within a slot 49 formed in the supporting shank 45 of the pen. The pen point is provided with a duct 43a which communicates with the ink-well and through which the ink is fed to the point of the pen.

It is preferred to maintain the points of the marking or recording instruments in coaxial relation on a line paralleling the axis of the last supporting spindle 13 and also on an arc intersecting said axis and struck from the center of the shaft 26, as otherwise the record produced on the chart by the recording instrument would be distorted and would not correspond to the contour of that portion of the last contacted by the tracing point during rotation of the last through a circle. Proper alinement of these points can be effected by reason of the fact that the tracing member 28 and penholder 41 are adjustable longitudinally on their supporting arms 29 and 40, respectively, so that they can be brought into alinement one with another. To facilitate such adjustment the penholder 41 has a tapered extension 41a, the point of which is centered relative to or made coaxial with respect to the axis of the pen point 43, the object being to provide a device, not shown, for use with the point of the extension and the extremity of the tracing point 28 to more conveniently and accurately aline said points one with another.

The tracing and recording instruments 29 and 43 are so positioned on their respective arms that their points are not only at equal distances from the axis of the oscillatory shaft 26, but are at a distance from said axis corresponding to the distance between the latter and the axis of the last-supporting spindle 13. In other words, if the arms 29 and 40 are rocked about the axis of the shaft 26 with the instruments adjusted to the position shown, the points of the instruments will coincide on an arc struck from the center of the shaft 26 and intersecting the axis about which the last is rotated. By maintaining the points in such relation relative to said axis and relative to each other an accurate full size contour of the last will be reproduced on the chart, corresponding to the cross sectional area of the last at any given point at which the tracing instrument is maintained in contact with the last during a complete revolution thereof.

It will be understood that the pen or chart marking instrument can be swung to different positions relative to the axis of the oscillatory shaft or support 26 by loosening the set screw 38 and turning the collar 37 to the desired position on the sleeve 35. It will also be understood that the penholder 41 can be adjusted toward or from the chart holder 21 to provide for the desired tension of the spring 47 whereby to regulate the pressure of the pen point on the chart, this being accomplished by loosening the set screw 36 and moving the sleeve 35 longitudinally on the rod 26 in the desired direction.

Contours corresponding to cross sections of the last at various points between the ends of the last may be reproduced on one or more charts carried by the holder 21, but it is preferred to start at one end of the last and to successively move the tracing point toward the opposite end equal distances in order to obtain a series of records on different charts which can be consecutively numbered in the order in which they are made to facilitate consideration of the various contours of a given last and comparison of the same with other lasts of known contours and dimensions when desired. To this end a gauge is provided by which the operator may set the tracing point 28 on the last adjacent one end thereof and accurately shift it the proper distance after the copying of the contours has been completed on one or more charts carried by the holder 21. The gauge comprises a strip 50 of suitable material, preferably a strip of rubber, having thereon lines or marks 51 spaced equal distances apart as shown in Fig. 2. The ends of the strip are connected with similarly constructed anchor blocks or parts 52 each of which is slidably mounted on a rod 53, the rods being slidably mounted in bearings 54 carried by the brackets 24, Fig. 2. The rods are provided with longitudinally extending slots or grooves 55 in which project the inner ends of the set screws 56 threaded within the bearings 54 and serving to hold the rods in adjusted position and to prevent turning of the same within the bearings. The anchor blocks or parts 52 are held in position upon the rods 53 by means of set screws 57, the inner ends of which project within the grooves of the rods. The blocks may be adjusted longitudinally on the rods to vary the position of the lines 51 of the scale 50 relative to the last or one of the blocks moved while the other remains fixed for the purpose of stretching the strip to vary the distances between the lines thereon if it is desired to increase said distances for lasts of greater lengths where it is desired to copy the same number of contours at correspondingly equal distances for each last regardless of its length.

In order that the arm 29 carrying the tracing point 28 may be shifted the proper distance after completing each chart, an index member 58 is pivotally mounted at 59 on an upstanding part 60 carried by the arm supporting slide 32, Figs. 2 and 4. The inner end of the index member overlies the strip 50 and it is made to coincide with the markings or lines 51 of the strip when moving the slide 32 on the rod 26 to successively advance the tracing point 28 from the heel end of the last toward the opposite end thereof.

In the operation of the machine the last is placed in position upon the driving spindle 13, as shown in Figs. 1 and 5, either before or after positioning one of the charts 22 on the disk 21, care being taken to see that the tracing and copying instruments are so adjusted on their respective arms that their points coincide on a line paralleling the axis of rotation of the last and on an arc intersecting said axis and struck from the center of the shaft carrying said arms, as previously stated.

The sleeve 32 carrying the arm for supporting the tracing instrument can be adjusted on the shaft or rod 26 to the desired starting point, with the index member 58 in position to coincide with one of the lines 50 of the scale nearest the disk 21. This will place the tracing point on the last relatively close to the extremity of the heel portion thereof. The position of the point of the recording instrument 43 on the chart, which may be a pen, pencil, or other suitable marking device, will be determined by the position of the tracing point 28 on the last since the recording instrument is responsive to the movements of the tracing instrument as the latter follows the contour of the last.

Rotation of the last for the purpose of copying the perimeters thereof is preferably effected by employing the hand to rotate the disk 21 carrying the chart 22, it being understood that a single revolution of the disk and last, which rotate as a unit and at the same speed will reproduce a complete contour of the last, regardless of the point at which the tracing instrument contacts the last. It will also be understood that upon completion of each reproducing operation that the sleeve 32 will be advanced one step on the rod 26 to position the index member in alinement with the next preceding mark 51 of the scale, after which the disk 21 may again be rotated to reproduce another contour or perimeter of the last. These operations may be continued until as many of the contours or perimeters of a given last have been reproduced as it may be desired to make. The contours successively copied in this manner may, if desired, be consecutively numbered and filed for use when needed.

I claim:

1. A machine for copying the contours of three dimensional objects, comprising relatively movable devices, one for supporting the object and another having connected therewith a tracing instrument and a recording instrument, means for adjusting the tracing instrument independently of the recording instrument and to different positions relative to the object and to the recording instrument, the tracing instrument being adapted to contact the object at each of said positions and the recording instrument being responsive to the movements of the tracing instrument when operating at each of said positions and adapted to reproduce on a surface the different contours of the object traversed by the tracing instrument, and means for effecting relative movement between said devices whereby to cause the tracing instrument to follow the contours of the object.

2. A machine for copying the contours of three dimensional objects, comprising a rotatable device for supporting the object, a chart holder fixed relative to and rotatable with said device, a movably mounted tracing instrument adjustable longitudinally of the axis of rotation of the object to different positions relative to the object and adapted to contact and to follow a contour of the object at each of said positions during rotation of the object, and a recording instrument responsive to the movements of the tracing instrument and adapted to contact a chart on said holder when operating at each of said positions.

3. A machine for copying the contours of a last, comprising relatively movable devices, one rotatably supporting the last and having a chart holder thereon fixed relative to the last and another having connected therewith a tracing instrument and a recording instrument, the points of said instruments being in all positions thereof on a line paralleling the axis of rotation of the last supporting device, the tracing instrument being adjustable to different positions to contact the last at different points thereof and the recording instrument being responsive to the movements of the tracing instrument when operating at said different positions and adapted to reproduce each of the contours of the last traversed by the tracing instrument on a chart carried by the holder, and means for rotating the last supporting device whereby to cause the tracing instrument to follow the different contours of the last.

4. A machine for copying the contours of a shoe last, comprising a rotatable supporting device for the last, a chart holder connected with and fixed relative to said device for rotation thereby about the axis of rotation of the last, an oscillatory member having a tracing instrument thereon adapted to contact the last and to follow the contour thereof during rotation of the last, and a recording instrument connected with said oscillatory member and adapted to reproduce on a chart carried by the holder the contour of the last traversed by the tracing instrument, the points of said instruments in all positions thereof being on a line paralleling the axis of rotation of said supporting device.

5. A machine for copying a contour of a shoe last corresponding to a transverse section of the last, comprising means for rotatably supporting the last, a movably mounted tracing instrument for contacting the last adapted to follow a contour thereof during rotation of the last, a chart, means for supporting the chart on said rotating means in fixed relation to the last, and a movable recording instrument connected with and actuated by the tracing instrument and adapted to reproduce said contour on the chart during rotation of the latter, the points of said instruments in all positions thereof being on a line paralleling the axis of rotation of said supporting means.

6. A machine for copying the contours of a last corresponding to transverse sections of the last, comprising rotatable supporting means for the last, a chart holder fixed on and rotatable with said means, a movably mounted tracing instrument adjustable to contact the last at different points between its ends, said instrument being adapted to follow the contours of the last during rotation of the last, and a recording instrument connected with and operated by the tracing instrument and adapted to separately reproduce said contours on different charts carried by said holder.

7. A machine for copying the contours of a last corresponding to transverse sections of the last, comprising rotatably mounted last supporting means, a tracing point for contacting the last, a chart mounted on and rotatable with said supporting means, a recording instrument having a copying point for contacting the chart, and oscillatory means forming a supporting connection between said tracing and copying points, said points being disposed on a line paralleling the axis of rotation of the last and each being on an arc intersecting said axis and struck from a point on the axis of oscillation of said supporting connection whereby to cause the copying point to reproduce a full size copy of the contour of the portion of the last traversed by said tracing point.

8. A machine for copying the contours of a last corresponding to transverse sections of the last, comprising rotatably mounted last supporting means, a tracing instrument for contacting the last, a recording instrument for contacting a chart, and oscillatory means forming a supporting connection between said tracing and recording instruments, the points of said instruments paralleling the axis of rotation of the last and each being on an arc intersecting said axis and struck from a point on the axis of oscillation of said connection whereby to cause the recording instrument to reproduce a full size copy of the contour of the portion of the last traversed by the point of said tracing instrument.

9. A machine for copying the contours of a last, comprising a bracket forming a bearing, a last supporting spindle journaled in the bearing and having its inner end adapted to engage the last within a recess formed in the heel portion thereof, a part rotatable with the spindle adapted to engage and prevent turning of the last upon the spindle, a chart supporting member on the outer end of the spindle, an oscillatory member having laterally extending arms thereon, a tracing instrument for contacting the last carried by one of the arms, and a recording instrument carried by the other of said arms for contacting the chart, said recording instrument being responsive to the movements of the tracing instrument and adapted to reproduce a contour of the last on the chart.

10. A machine for copying the contours of a last, comprising rotatably mounted last supporting means, a holder rotatable with said supporting means and adapted to support a chart in a plane transverse to the axis of rotation of the supporting means, a member adapted for oscillation about an axis substantially paralleling the axis of rotation of the last, and a pair of laterally extending arms on said member, one having a tracing instrument thereon for contacting the last and the other provided with a laterally extending member having a recording pen free to move longitudinally thereon and adapted to contact the chart, said pen having means for yieldingly holding it in contact with the chart and being provided with a well for holding and supplying a writing fluid to the pen.

11. A machine for copying the contours of a last, comprising rotatably mounted last supporting means, a holder rotatable with said means adapted to support a chart in a plane transverse to the axis of rotation of the supporting means, and a supporting member adapted for oscillation about an axis substantially paralleling the axis of rotation of the last, said member having a pair of laterally extending arms thereon, one provided with a recording instrument adapted to contact a chart carried by the holder, and the other having a tracing instrument thereon for contacting the last, said last mentioned arm being adjustable longitudinally on said member to adjust the tracing instrument for contact with the last at different predetermined points between its ends.

12. A machine for copying the contours of a last, comprising rotatably mounted last supporting means, a holder rotatable with said means adapted to support a chart in a plane transverse to the axis of rotation of the supporting means, a supporting member adapted for oscillation about an axis substantially paralleling the axis of rotation of the last, said member having a pair of laterally extending arms thereon, one provided with a recording instrument adapted to contact a chart carried by the holder, and the other having a tracing instrument thereon for contacting the last, said last mentioned arm being adjustable longitudinally on said member to adjust the tracing instrument for contact with the last at different predetermined points between its ends, a scale disposed adjacent to said oscillatory member, and an index member associated with the arm carrying the tracing instrument and movable therewith for cooperation with the scale to facilitate adjustment of the tracing instrument to the desired points relative to the last.

13. A machine for copying the contours of a last, comprising rotatably mounted last supporting means, a holder rotatable with said means adapted to support a chart in a plane transverse to the axis of rotation of the supporting means, a supporting member adapted for oscillation about an axis substantially paralleling the axis of rotation of the last, said member having a pair of laterally extending arms thereon, one provided with a recording instrument adapted to contact a chart carried by the holder and the other having a tracing instrument thereon for contacting the last, said last mentioned arm being adjustable longitudinally on said member, a resilient strip extending longitudinally of the axis of said supporting member and having markings forming a scale, an index member movable with the arm carrying the tracing instrument and adapted for cooperation with the scale to facilitate adjustment of the tracing instrument to different predetermined positions between the ends of the last, and supporting means for the strip including a part adjustable to stretch the strip whereby to uniformly increase the distances between said markings when desired.

14. A machine for copying the contours of a last corresponding to transverse sections of the last, comprising means for rotating the last, a chart holder rotatable with said means, a movably mounted tracing instrument adjustable to contact the last at different predetermined points between its ends, said instrument being adapted to follow the contours of the last during rotation of the same, a recording instrument connected with and operated by the tracing instrument and adapted to reproduce said contours on one or more charts carried by said holder, a resilient strip provided with markings forming a scale, means for stretching the strip to uniformly vary the distances between said markings, and an index member movable with said adjustable tracing instrument and adapted for cooperation with said markings to facilitate movement of the tracing instrument to said predetermined points.

15. A machine for copying the contours of a last, comprising a rotatably mounted last supporting member, means on said member adapted to support a chart in a plane transverse to the axis of said member and for rotation about the axis thereof, a shaft adapted for oscillation about an axis substantially paralleling the axis of rotation of the last, a laterally extending arm on said shaft having a recording instrument provided with a point for contacting the chart, a second arm on said shaft, and a tracing instrument on said second arm having a point for contacting the last, the points of said instruments being on a line paralleling the axis of rotation of the last and being on an arc intersecting said axis and struck from the center of said shaft, said recording instrument being responsive to the movements of the tracing instrument and adapted to reproduce a contour of the last on the chart.

16. A machine for copying the contours of three dimensional objects, comprising a rotatably mounted object supporting member having a holder fixed thereon for supporting a sheet in a plane transverse to the axis of rotation of said member and for rotation with said member, and a pair of connected arms mounted for oscillation about an axis substantially paralleling the axis of rotation of said member, one of said arms having a tracing instrument for contacting the object the axis of which is transverse to that of the axis of rotation of the object and the other of said arms having a recording instrument for engaging the sheet of the holder to reproduce thereon the contour of the object traversed by said tracing instrument during rotation of the object and the sheet.

17. A machine for copying the contours of lasts, comprising a rotatably mounted last supporting member having a holder for supporting a sheet in a plane transverse to the axis of rotation of said member and for rotation with said member, a pair of connected arms mounted for oscillation about an axis substantially paralleling the axis of rotation of said member, one of said arms having a tracing instrument for contacting the last and the other having a recording instrument for engaging the sheet of the holder to reproduce thereon the contour of the last traversed by said tracing instrument during rotation of the last and the sheet, the points of said instruments each being on an arc intersecting the axis of rotation of the last and each of said arcs being struck from a point on the axis of oscillation of said arms, and means supporting the arm having the tracing instrument for adjustment longitudinally of the axis of rotation of the last.

18. A machine for copying the contours of lasts, comprising a rotatably mounted last supporting member having a holder fixed thereon for supporting a sheet in a plane transverse to the axis of rotation of said member and for rotation with said member, a pair of connected arms mounted for oscillation about an axis substantially paralleling the axis of rotation of said member, one of said arms having a tracing instrument for contacting the last and the other having a recording instrument for engaging the sheet of the holder to reproduce thereon the contour of the last traversed by said tracing instrument during rotation of the last and the sheet, and means for supplying a marking fluid to said recording instrument.

19. A machine for copying the contours of lasts, comprising a rotatably mounted last supporting member having a holder for supporting a sheet in a plane transverse to the axis of rotation of said member and for rotation with said member, a pair of connected arms mounted for oscillation about an axis substantially paralleling the axis of rotation of said member, one of said arms having a tracing instrument for contacting the last and the other having a recording instrument for engaging the sheet of the holder to reproduce thereon the contour of the last traversed by said tracing instrument during rotation of the last and the sheet, means supporting the arm having the tracing instrument for adjustment longitudinally of the axis of rotation of the last, a resilient strip substantially paralleling said last mentioned axis and having spaced markings forming a scale, an index member movable with the arm carrying the tracing instrument and adapted for cooperation with the scale to facilitate adjustment of the tracing instrument to different predetermined positions between the ends of the last, and supporting means for said strip including a part adjustable to stretch the strip whereby to uniformly increase the distance between said markings when desired.

RUSSELL PLATO SCHWARTZ.